(12) United States Patent
Isami

(10) Patent No.: US 12,533,963 B2
(45) Date of Patent: Jan. 27, 2026

(54) BATTERY ELECTRIC VEHICLE AND CONTROL METHOD OF BATTERY ELECTRIC VEHICLE

(71) Applicant: TOYOTA JIDOSHA KABUSHIKI KAISHA, Toyota (JP)

(72) Inventor: Yoichiro Isami, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/604,111

(22) Filed: Mar. 13, 2024

(65) Prior Publication Data
US 2024/0308497 A1 Sep. 19, 2024

(30) Foreign Application Priority Data

Mar. 16, 2023 (JP) ................................ 2023-041574

(51) Int. Cl.
*B60L 15/20* (2006.01)
*B60K 35/21* (2024.01)
(Continued)

(52) U.S. Cl.
CPC ............ *B60L 15/20* (2013.01); *B60K 35/213* (2024.01); *B60W 10/06* (2013.01); *B60W 10/08* (2013.01);
(Continued)

(58) Field of Classification Search
CPC .. B60L 15/20; B60L 2260/26; B60L 2250/16; Y02T 90/16; B60W 20/15;
(Continued)

(56) References Cited

U.S. PATENT DOCUMENTS

| 2008/0060861 A1* | 3/2008 | Baur | ........................ B60K 1/00 |
| | | | 180/65.6 |
| 2010/0166210 A1* | 7/2010 | Isozaki | ..................... B60L 3/00 |
| | | | 381/86 |

(Continued)

FOREIGN PATENT DOCUMENTS

| DE | 102022117147 A1 * | 1/2023 | ............. G10K 15/02 |
| DE | 102021209652 A1 * | 3/2023 | ............. B60L 15/20 |

(Continued)

OTHER PUBLICATIONS

EPO machine translation of JP 2022-42730A (original JP document published Mar. 15, 2022) (Year: 2022).*

*Primary Examiner* — David A Testardi
(74) *Attorney, Agent, or Firm* — Sughrue Mion, PLLC

(57) ABSTRACT

A battery electric vehicle includes: a motor; a mode selection device that selects, by an operation of a driver, one travel mode from a plurality of travel modes including a motor travel mode and a variable-speed travel mode; a controller that controls the motor such that the battery electric vehicle travels in the travel mode selected by the mode selection device; and a speed indication display that indicates a speed of an engine in an engine vehicle of which torque behavior is simulated in the variable-speed travel mode. The controller is configured to vary the speed of the engine indicated on the speed indication display when the travel mode transitions from the motor travel mode to the variable-speed travel mode.

6 Claims, 2 Drawing Sheets

(51) Int. Cl.
*B60W 10/06* (2006.01)
*B60W 10/08* (2006.01)
*B60W 20/30* (2016.01)
*B60W 30/182* (2020.01)
*B60W 50/14* (2020.01)

(52) U.S. Cl.
CPC .......... *B60W 20/30* (2013.01); *B60W 30/182* (2013.01); *B60W 50/14* (2013.01); *B60L 2250/16* (2013.01); *B60W 2510/0638* (2013.01); *B60W 2510/081* (2013.01); *B60W 2710/0644* (2013.01)

(58) Field of Classification Search
CPC .. B60W 20/30; B60W 30/182; B60W 50/082; B60W 50/14; B60K 35/213
See application file for complete search history.

(56) References Cited

U.S. PATENT DOCUMENTS

| | | | | |
|---|---|---|---|---|
| 2012/0083958 A1* | 4/2012 | Ballard | ................ | B60W 50/10 701/56 |
| 2013/0035817 A1* | 2/2013 | Bahar | ................ | B60K 6/46 701/22 |
| 2014/0195088 A1* | 7/2014 | Schuessler | ............ | B60W 50/14 701/22 |
| 2015/0032356 A1* | 1/2015 | Jerger | ................ | F02D 41/08 701/101 |
| 2016/0107652 A1* | 4/2016 | Kim | ................ | B60K 35/80 701/54 |
| 2018/0194226 A1* | 7/2018 | Tanizoe | ......... | B60W 30/18027 |
| 2018/0209870 A1* | 7/2018 | Yamamoto | ............. | F16H 59/42 |
| 2021/0053487 A1* | 2/2021 | Vangelov | ............. | B60W 50/10 |
| 2021/0229550 A1* | 7/2021 | Isami | ................ | B60L 15/2054 |
| 2021/0387529 A1* | 12/2021 | Oh | ............ | B60W 30/19 |
| 2021/0387530 A1* | 12/2021 | Oh | ............ | F16H 61/0213 |
| 2021/0387531 A1* | 12/2021 | Oh | ............ | B60W 30/19 |
| 2022/0041062 A1* | 2/2022 | Nishimine | ............. | B60H 1/249 |
| 2022/0041064 A1* | 2/2022 | Nishimine | ............. | B60L 50/10 |
| 2022/0041065 A1* | 2/2022 | Isami | ................ | B60K 23/00 |
| 2022/0041066 A1* | 2/2022 | Isami | ................ | B60K 23/02 |
| 2022/0041067 A1* | 2/2022 | Isami | ................ | B60L 15/2054 |
| 2022/0041070 A1* | 2/2022 | Isami | ................ | B60L 50/60 |
| 2022/0041157 A1* | 2/2022 | Imamura | ............. | B60W 20/15 |
| 2022/0063494 A1* | 3/2022 | Duo' | ............. | B60L 7/18 |
| 2023/0039347 A1* | 2/2023 | Isami | ................ | B60L 3/0061 |
| 2024/0181894 A1* | 6/2024 | Nishimine | ............... | H02P 6/08 |
| 2024/0246425 A1* | 7/2024 | Isami | ................ | B60K 23/02 |

FOREIGN PATENT DOCUMENTS

| | | | | |
|---|---|---|---|---|
| EP | 2287058 A1 * | 2/2011 | ............... | B60K 6/48 |
| JP | 2021151168 A * | 9/2021 | | |
| JP | 2022-30868 A | 2/2022 | | |
| JP | 2022-34649 A | 3/2022 | | |
| JP | 2022-36845 A | 3/2022 | | |
| JP | 2022035224 A * | 3/2022 | | |
| JP | 2022035225 A * | 3/2022 | | |
| JP | 2022042730 A * | 3/2022 | | |
| JP | 2022044955 A * | 3/2022 | | |
| WO | WO-2020025860 A1 * | 2/2020 | | |

\* cited by examiner

BATTERY ELECTRIC VEHICLE AND CONTROL METHOD OF BATTERY ELECTRIC VEHICLE

CROSS-REFERENCE TO RELATED APPLICATION

This application claims priority to Japanese Patent Application No. 2023-041574 filed on Mar. 16, 2023, incorporated herein by reference in its entirety.

BACKGROUND

1. Technical Field

The present invention relates to a battery electric vehicle and a control method of a battery electric vehicle.

2. Description of Related Art

A battery electric vehicle of this type has been proposed that includes a motor that outputs motive power to a driveshaft coupled to an axle and a mode selection device that selects, by a driver's operation, one travel mode from a plurality of travel modes including a motor travel mode and a variable-speed travel mode (e.g., see Japanese Unexamined Patent Application Publication No. 2022-036845 (JP 2022-036845 A)). The motor travel mode is a travel mode of traveling while controlling the motor such that a required torque required for traveling is output to the driveshaft. The variable-speed travel mode is a travel mode of traveling while controlling the motor such that a torque output to the driveshaft based on the driver's shifting operation meets a torque that simulates torque behavior in an engine vehicle including an engine and a stepped transmission.

SUMMARY

In the above-described battery electric vehicle, it is sometimes difficult for a driver to perceive that the travel mode has transitioned from the motor travel mode to the variable-speed travel mode.

A main object of the battery electric vehicle of this disclosure is to allow a driver to perceive that the travel mode has transitioned from the motor travel mode to the variable-speed travel mode.

To achieve this main object, the battery electric vehicle of this disclosure has adopted the following solutions.

A first aspect of this disclosure is a battery electric vehicle. The battery electric vehicle includes: a motor configured to output a torque to a driveshaft coupled to an axle; a mode selection device configured to select, by an operation of a driver, one travel mode from a plurality of travel modes including a motor travel mode and a variable-speed travel mode; a controller configured to control the motor such that the battery electric vehicle travels in the travel mode selected by the mode selection device; and a speed indication display configured to indicate a speed of the engine in the engine vehicle of which the torque behavior is simulated in the variable-speed travel mode. The motor travel mode is a mode of traveling while controlling the motor such that a required torque required for traveling is output to the driveshaft. The variable-speed travel mode is a mode of traveling while controlling the motor such that a torque output to the driveshaft based on a shifting operation of the driver meets a predetermined torque. The predetermined torque is a torque that simulates torque behavior in an engine vehicle including an engine and a stepped transmission. The controller is configured to vary the speed of the engine indicated on the speed indication display when the travel mode transitions from the motor travel mode to the variable-speed travel mode.

As a result, the driver can perceive that the travel mode has transitioned from the motor travel mode to the variable-speed travel mode.

In the above-described battery electric vehicle, the controller may be configured to, when the travel mode transitions from the motor travel mode to the variable-speed travel mode, vary the speed of the engine indicated on the speed indication display in the same manner as the speed of the engine varies when the engine is started in the engine vehicle of which the torque behavior is simulated in the variable-speed travel mode. Thus, when the travel mode has transitioned from the motor travel mode to the variable-speed travel mode, an effect as if an engine were started is produced, which can enhance the driver's feeling of exaltation.

In the above-described battery electric vehicle, the controller may be configured to, when the travel mode transitions from the motor travel mode to the variable-speed travel mode, vary the speed of the engine indicated on the speed indication display so as to increase from a self-sustaining speed of the engine and then decrease back to the self-sustaining speed. Thus, when the travel mode has transitioned from the motor travel mode to the variable-speed travel mode, an effect as if an engine were started can be more accurately produced.

In the above-described battery electric vehicle, the controller may be configured to, when the battery electric vehicle travels in the variable-speed travel mode, set a virtual engine speed based on a rotation speed of the driveshaft and a gear ratio of the stepped transmission of the engine vehicle of which the torque behavior is simulated, and control the motor such that a torque based on an accelerator operation amount and the virtual engine speed is output to the driveshaft. The controller may be configured to vary the speed of the engine indicated on the speed indication display regardless of the virtual engine speed when the travel mode transitions from the motor travel mode to the variable-speed travel mode. Thus, the driver can perceive that the travel mode has transitioned from the motor travel mode to the variable-speed travel mode, without the torque output from the motor being affected.

The above-described battery electric vehicle may further include a speaker that outputs audio. The controller may be configured to control the speaker such that a sound linked to the speed of the engine indicated on the speed indication display is output when the travel mode transitions from the motor travel mode to the variable-speed travel mode. Thus, when the travel mode has transitioned from the motor travel mode to the variable-speed travel mode, a sound linked to the engine speed indicated on the speed indication display is output, so that the driver can auditorily perceive that the travel mode has transitioned from the motor travel mode to the variable-speed travel mode.

A second aspect of this disclosure is a control method of a battery electric vehicle. The battery electric vehicle includes: a motor configured to output a torque to a driveshaft coupled to an axle; a mode selection device configured to select, by an operation of a driver, one travel mode from a plurality of travel modes including a motor travel mode and a variable-speed travel mode; a controller configured to control the motor such that the battery electric vehicle travels in the travel mode selected by the mode selection device; and a speed indication display configured to indicate a speed of the engine in the engine vehicle of which the torque behavior is simulated in the variable-speed travel mode. The motor travel mode is a mode of traveling while controlling the motor such that a required torque required for traveling is output to the driveshaft. The variable-speed travel mode is a mode of traveling while controlling the motor such that a torque output to the driveshaft based on a shifting operation of the driver meets a predetermined torque. The predetermined torque is a torque that simulates torque behavior in an engine vehicle including an engine and a stepped transmission. The control method includes varying, by the controller, the speed of the engine indicated on the speed indication display when the travel mode transitions from the motor travel mode to the variable-speed travel mode. As a result, the driver can perceive that the travel mode has transitioned from the motor travel mode to the variable-speed travel mode.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Next, a form to implement the present invention will be described using an embodiment.

Figure 1:
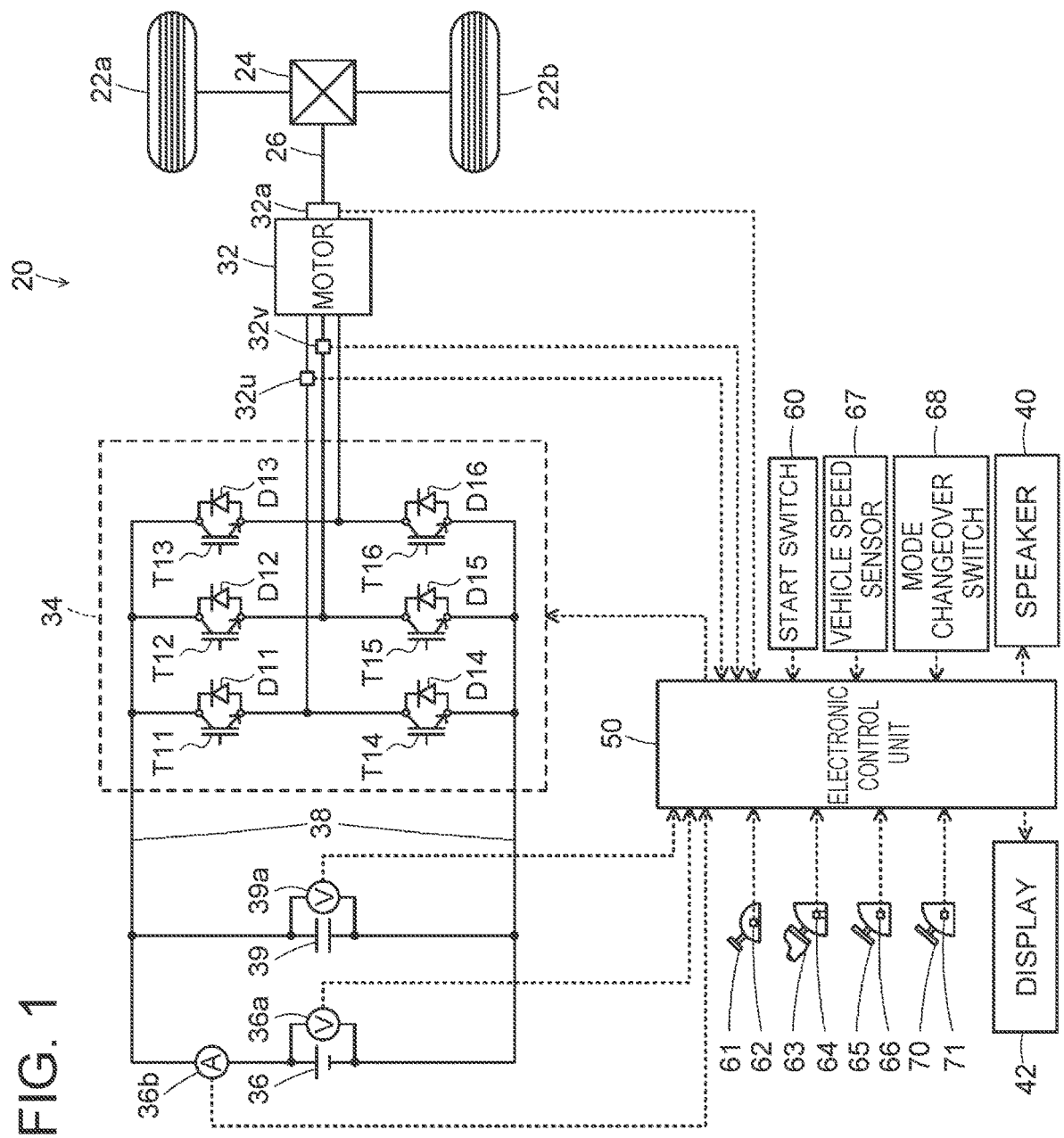
FIG. 1 is a configuration diagram showing an overview of the configuration of a battery electric vehicle 20 as one embodiment of the present invention.

FIG. 1 is a configuration diagram showing an overview of the configuration of a battery electric vehicle 20 as one embodiment of the present invention. As shown, the battery electric vehicle 20 of the embodiment includes a motor 32 for traveling, an inverter 34, a battery 36, a speaker 40, a display 42, and an electronic control unit (hereinafter referred to as an "ECU") 50.

The motor 32 is configured as a three-phase alternating-current motor, and includes a rotor having permanent magnets embedded in a rotor core and a stator having three-phase coils wound around a stator core. The rotor of the motor 32 is connected to a driveshaft 26 that is coupled to drive wheels 22a, 22b through a differential gear 24.

The inverter 34 is used to drive the motor 32. The inverter 34 is connected to the battery 36 through power lines 38, and has six transistors T11 to T16 as switching elements and six diodes D11 to D16 connected in parallel to the respective six transistors T11 to T16. The transistors T11 to T16 are disposed in pairs, each pair having one transistor on a source side and the other transistor on a sink side relative to a positive electrode-side line and a negative electrode-side line of the power lines 38. A connection point between the two transistors of each pair is connected to the coil of a corresponding phase (a U-phase, a V-phase, or a W-phase) of the motor 32. Thus, as the ECU 50 adjusts a ratio of on-times of the transistors T11 to T16 forming pairs while a voltage is applied to the inverter 34, a rotating magnetic field is formed in the three-phase coils and the motor 32 is driven to rotate.

The battery 36 is configured as a lithium-ion secondary battery or a nickel-metal hydride secondary battery, and is connected to the inverter 34 through the power lines 38. A capacitor 39 for smoothing is mounted on the power lines 38.

The speaker 40 is installed near a driver's seat. The speaker 40 is configured as an audio output device that outputs audio so as to be auditorily perceivable. The speaker 40 is controlled by the ECU 50.

The display 42 is installed near the driver's seat. The display 42 is configured as an indication device that indicates various pieces of information so as to be visually perceivable. The display 42 is controlled by the ECU 50.

The ECU 50 includes a microcomputer having a CPU, an ROM, an RAM, a flash memory, and an input-output port. The ECU 50 receives inputs of a rotation position θm of the rotor of the motor 32 from a rotation position sensor 32a, phase currents Iu, Iv of the U-phase and the V-phase of the motor 32 from current sensors 32u, 32v, a voltage Vb of the battery 36 from a voltage sensor 36a, a current Ib of the battery 36 from a current sensor 36b, and a voltage VL of the power lines 38 (capacitor 39) from a voltage sensor 39a. Further, the ECU 50 receives inputs of a start signal from a start switch 60, a shift position SP that is an operation position of a shift lever 61 from a shift position sensor 62, an accelerator operation amount Acc that is an amount of depression of an accelerator pedal 63 from an accelerator pedal sensor 64, and a brake pedal position BP that is an amount of depression of a brake pedal 65 from a brake pedal sensor 66. In addition, the ECU 50 receives inputs of a vehicle speed V from a vehicle speed sensor 67, a switch signal from a mode changeover switch 68, and an amount of depression Da of a clutch pedal (quasi-clutch pedal) 70 from a clutch pedal sensor 71. The shift lever 61 has a configuration that simulates a shift device included in a vehicle equipped with a manual transmission. The shift lever 61 can select, as the shift position SP, one range among a plurality of shift ranges corresponding to gear stages of the manual transmission being simulated, for example, a first gear range to a sixth gear range and a neutral range being simulated. Each time the mode changeover switch 68 is turned on, the mode changeover switch 68 outputs a mode changeover instruction for switching between a motor travel mode and a variable-speed travel mode. The motor travel mode and the variable-speed travel mode will be described later. The clutch pedal 70 has a configuration that simulates a clutch pedal installed in an engine vehicle being simulated. The clutch pedal 70 is configured to be similar to a clutch pedal of a vehicle equipped with a manual transmission in terms of the arrangement and the operational feeling. From the ECU 50, a control signal to the motor 32, an audio signal to the speaker 40, an indication signal to the display 42, etc. are output.

In the battery electric vehicle 20 of the embodiment, the ECU 50 controls the motor 32 (inverter 34) such that the battery electric vehicle 20 travels in the motor travel mode of traveling while the motor 32 outputs a required torque required for traveling, or in the variable-speed travel mode of traveling in such a manner that behavior of a torque output from the motor 32 based on the driver's operation of the shift lever 61 matches torque behavior in an engine vehicle including an engine and a manual transmission as a stepped transmission.

In the motor travel mode, regardless of the shift position SP or the amount of depression Da of the clutch pedal 70, a travel-required torque Td* required for traveling (required for the driveshaft 26) is set as a torque command Tm* for the motor 32, and the transistors T11 to T16 of the inverter 34 are controlled such that the motor 32 is driven according to the torque command Tm*. Here, the travel-required torque Td* is set based on the accelerator operation amount Acc and the vehicle speed V.

In the variable-speed travel mode, a virtual engine speed Ne as an engine speed in an engine vehicle being simulated is set using a rotation speed Np of the driveshaft 26 (a rotation speed Nm of the motor 32), a gear ratio "r" corresponding to the shift position SP, and a slip ratio "slip" of the clutch pedal 70 based on the amount of depression Da of the clutch pedal 70. Based on the accelerator operation amount Acc and the virtual engine speed Ne, a virtual engine output torque Teout that is output from the engine of the engine vehicle being simulated is set. Based on the slip ratio "slip" of the clutch pedal 70, a transmission input torque Tmtin is calculated by multiplying a torque transmission gain k that is a transmission ratio of a torque from the engine to the manual transmission by the virtual engine output torque Teout. The torque transmission gain k is set to be smaller when the amount of depression Da of the clutch pedal 70 is large than when the amount of depression Da is small, and is set so as to assume the value 0 when the amount of depression Da of the clutch pedal 70 is a maximum amount of depression at which the torque transmission gain k between the engine and the manual transmission assumes the value 0. A transmission output torque Tmtout is calculated by multiplying the transmission input torque Tmtin by the gear ratio "r" corresponding to the shift position SP. With the transmission output torque Tmtout set as the torque command Tm* for the motor 32, the transistors T11 to T16 of the inverter 34 are controlled such that the motor 32 is driven according to the torque command Tm*. Under such control, the motor 32 is controlled to make the battery electric vehicle 20 travel in such a manner that the behavior of the torque output from the motor 32 based on the driver's operation of the shift lever 61 matches torque behavior in an engine vehicle including an engine and a manual transmission. Thus, traveling that simulates an engine vehicle including an engine and a manual transmission becomes possible, and the driver can experience a sensation as if the driver were driving an engine vehicle including an engine and a manual transmission.

Figure 2:
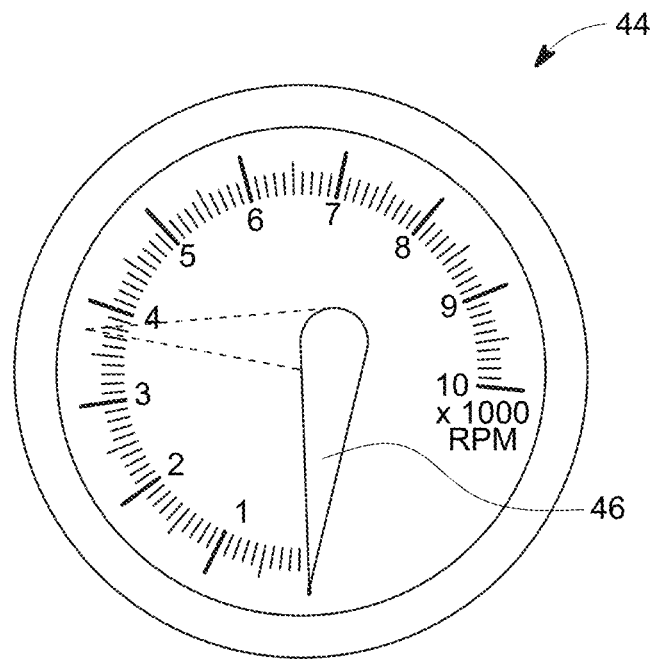
FIG. 2 is an explanatory view showing one example of a virtual tachometer 44 indicated on a display 42.

In the variable-speed travel mode, the ECU 50 controls the speaker 40 such that, from engine sounds for the respective engine speeds that have been recorded beforehand, a sound (engine sound) linked to the virtual engine speed Ne is output. The ECU 50 controls the display 42 such that a virtual tachometer 44 is indicated on the display 42. FIG. 2 is an explanatory view showing one example of the virtual tachometer 44 indicated on the display 42. Since the battery electric vehicle 20 of the embodiment is actually not equipped with an engine, basically the virtual engine speed Ne is indicated on the tachometer 44. When the virtual engine speed Ne increases, the angle of a needle 46 of the tachometer 44 changes as indicated by the broken line. Such a sound from the speaker 40 and indication of the tachometer 44 give the driver a feeling of exaltation as if the driver were driving an engine vehicle including an engine and a manual transmission.

Next, operation of the battery electric vehicle 20 of the embodiment configured as has been described above, particularly operation when the travel mode has transitioned from the motor travel mode to the variable-speed travel mode will be described.

Figure 3:
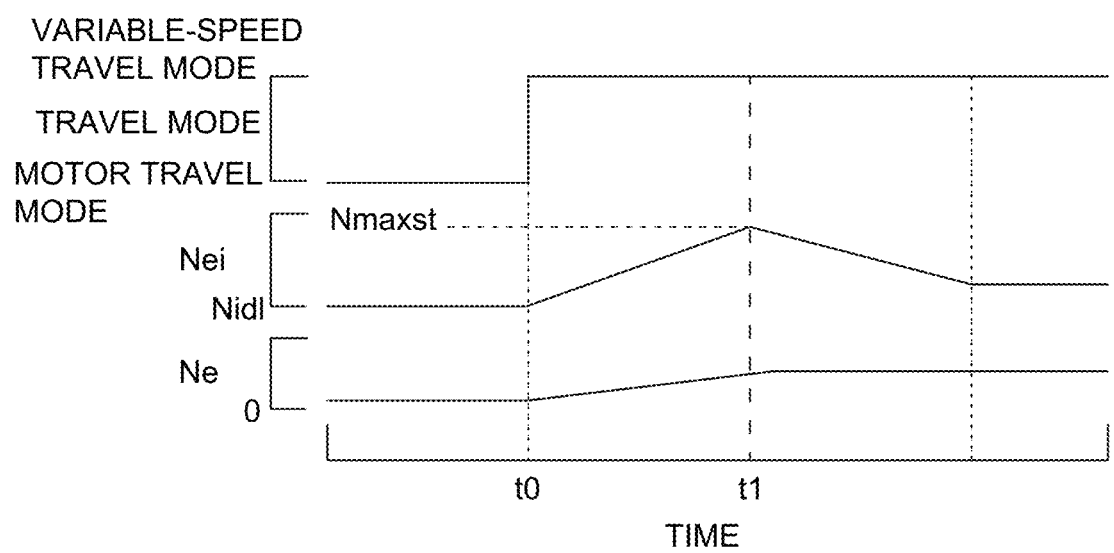
FIG. 3 is a timing chart showing one example of changes over time in a travel mode, an engine speed Nei for indication that is indicated on the tachometer 44 of the display 42, and a virtual engine speed Ne.

FIG. 3 is a timing chart showing one example of changes over time in the travel mode, the engine speed Nei on the tachometer 44 indicated on the display 42, and the virtual engine speed Ne. When the travel mode changes from the motor travel mode to the variable-speed travel mode (time t0), the ECU 50 increases the engine speed Nei for indication, regardless of the virtual engine speed Ne, from a self-sustaining speed Nidl (e.g., 800 rpm, 900 rpm, or 1000 rpm) of the engine installed in the engine vehicle being simulated. When the engine speed Nei has reached a maximum speed Nmaxst that has been set beforehand as a maximum value of the speed of the engine at start-up (time t1), the ECU 50 decreases the engine speed Nei to the self-sustaining speed Nidl. By such processing, the engine speed Nei on the tachometer 44 can be varied in the same manner as the engine speed varies when the engine is started in the engine vehicle of which the torque behavior is simulated in the variable-speed travel mode. Thus, an effect as if an engine were started can be produced, and the driver can perceive that the travel mode has transitioned from the motor travel mode to the variable-speed travel mode, as well as the driver's feeling of exaltation can be enhanced. In this case, since the engine speed Nei is varied e.g., to vary at a rate different from (FIG. 3) and regardless of the virtual engine speed Ne, the driver can perceive that the travel mode has transitioned from the motor travel mode to the variable-speed travel mode, without the behavior of the torque output from the motor 32 being affected. Further, in this case, an engine sound linked to the engine speed Nei for indication is output from the speaker 40. Thus, the driver can also auditorily perceive that the travel mode has transitioned from the motor travel mode to the variable-speed travel mode.

After the engine speed Nei has been decreased to the self-sustaining speed Nidl, the display 42 is controlled such that the virtual engine speed Ne is indicated on the tachometer 44, and the speaker 40 is controlled such that a sound linked to the virtual engine speed Ne is output from the speaker 40. Thus, in the variable-speed travel mode, the driver is given a feeling of exaltation as if the driver were driving an engine vehicle equipped with a manual transmission.

The battery electric vehicle 20 of the embodiment having been described above includes the display 42 that indicates the tachometer 44. When the travel mode transitions from the motor travel mode to the variable-speed travel mode, the engine speed Nei for indication that is indicated on the display 42 is varied, so that the driver can perceive that the motor travel mode has transitioned from the motor travel mode to the variable-speed travel mode.

When the travel mode transitions from the motor travel mode to the variable-speed travel mode, the engine speed Nei on the tachometer 44 indicated on the display 42 is varied in the same manner as the engine speed varies when the engine is started in the engine vehicle of which the torque behavior is simulated in the variable-speed travel mode. Thus, when the travel mode has transitioned from the motor travel mode to the variable-speed travel mode, an effect as if an engine were started is produced, which can enhance the driver's feeling of exaltation.

Moreover, when the travel mode transitions from the motor travel mode to the variable-speed travel mode, the engine speed Nei on the tachometer 44 indicated on the display 42 is varied so as to increase from the self-sustaining speed Nidl of the engine and then decrease back to the self-sustaining speed Nidl. Thus, when the travel mode has transitioned from the motor travel mode to the variable-speed travel mode, an effect as if an engine were started can be produced.

When the battery electric vehicle 20 travels in the variable-speed travel mode, the virtual engine speed Ne is set based on the rotation speed of the driveshaft 26 and the gear ratio of the stepped transmission as the manual transmission of the engine vehicle of which the torque behavior is simulated, and the motor 32 is controlled such that a torque based on the accelerator operation amount Acc and the virtual engine speed Ne is output to the driveshaft 26. When the travel mode transitions from the motor travel mode to the variable-speed travel mode, the engine speed Nei for indication is varied regardless of the virtual engine speed Ne, so that the driver can perceive that the travel mode has transitioned from the motor travel mode to the variable-speed travel mode.

The battery electric vehicle 20 further includes the speaker 40 that outputs audio. When the travel mode transitions from the motor travel mode to the variable-speed travel mode, the speaker 40 is controlled so as to output a sound linked to the engine speed Nei for indication, so that the driver can auditorily perceive that the travel mode has transitioned from the motor travel mode to the variable-speed travel mode.

In the battery electric vehicle 20 of the embodiment, when the travel mode transitions from the motor travel mode to the variable-speed travel mode, the engine speed Nei on the tachometer 44 indicated on the display 42 is varied so as to increase from the self-sustaining speed Nidl of the engine and then decrease back to the self-sustaining speed Nidl. However, the engine speed Nei on the tachometer 44 indicated on the display 42 should be at least varied when the travel mode transitions from the motor travel mode to the variable-speed travel mode. Therefore, for example, the engine speed Nei may be increased from a speed different from the self-sustaining speed Nidl and then decreased, and may be decreased back to a speed different from the self-sustaining speed Nidl. Or the engine speed Nei on the tachometer 44 may be fluctuated so as to increase and decrease multiple times repeatedly.

In the battery electric vehicle 20 of the embodiment, the shift position SP is changed by the driver's operation of the shift lever 61. However, the present invention can be applied also in the case where two paddle switches disposed near a steering wheel are included and the shift position SP is changed by upshifting or downshifting based on a paddle signal from the paddle switches.

Correspondence relationships between main elements of the embodiment and main elements of the invention described in the section SUMMARY OF THE INVENTION will be described. In the embodiment, the motor 32 is one example of the "motor"; the mode changeover switch 68 is one example of the "mode selection device"; the ECU 50 is one example of the "controller"; and the display 42 is one example of the "speed indication display."

Since the embodiment is one example for specifically describing a form to implement the invention described in the section SUMMARY OF THE INVENTION, the correspondence relationships between the main elements of the embodiment and the main elements of the invention described in the section SUMMARY OF THE INVENTION do not limit the elements of the invention described in the section SUMMARY OF THE INVENTION. Thus, the invention described in the section SUMMARY OF THE INVENTION should be construed based on the description in that section, and the embodiment is merely one specific example of the invention described in the section SUMMARY OF THE INVENTION.

While the form to implement the present invention has been described above using the embodiment, it goes without saying that the present invention is not in any way limited to such an embodiment and can be implemented in various forms within such a range as not to depart from the gist of the present invention.

The present invention can be used in the battery electric vehicle manufacturing industry.

What is claimed is:

1. A battery electric vehicle comprising:
    a motor configured to output a torque to a driveshaft coupled to an axle;
    a switch configured to select, by an operation of a driver, one travel mode from a plurality of travel modes including a motor travel mode and a variable-speed travel mode, the motor travel mode being a mode of traveling while controlling the motor such that a required torque required for traveling is output to the driveshaft, the variable-speed travel mode being a mode of traveling while controlling the motor such that a torque output to the driveshaft meets a predetermined torque based on an input by the driver to select a gear stage, the predetermined torque being a torque that simulates torque behavior in an engine vehicle including an engine and a stepped transmission;
    a controller configured to:
        control the motor such that the battery electric vehicle travels in the travel mode selected by the switch,
        when the battery electric vehicle travels in the variable-speed travel mode, set a virtual engine speed based on a rotation speed of the driveshaft and a gear ratio of the selected gear stage of the stepped transmission corresponding to the engine vehicle of which the torque behavior is simulated, and
        when the battery electric vehicle travels in the variable-speed travel mode, control a torque output to the driveshaft of the motor based on an accelerator operation amount and the virtual engine speed; and
    a speed indication display configured to indicate a speed of the engine in the engine vehicle of which the torque behavior is simulated in the variable-speed travel mode, wherein
    the controller is configured to vary the speed of the engine indicated on the speed indication display to be different from the virtual engine speed when the travel mode has transitioned from the motor travel mode to the variable-speed travel mode.

2. The battery electric vehicle according to claim 1, wherein the controller is configured to, when the travel mode transitions from the motor travel mode to the variable-speed travel mode, vary the speed of the engine indicated on the speed indication display in a manner that simulates a speed of the engine when the engine is started in the engine vehicle of which the torque behavior is simulated in the variable-speed travel mode.

3. The battery electric vehicle according to claim 1, wherein the controller is configured to, when the travel mode transitions from the motor travel mode to the variable-speed travel mode, vary the speed of the engine indicated on the speed indication display so as to increase from a self-sustaining speed of the engine.

4. The battery electric vehicle according to claim 1, further comprising a speaker configured to output audio, wherein the controller is configured to control the speaker such that a sound linked to the speed of the engine indicated on the speed indication display is output when the travel mode transitions from the motor travel mode to the variable-speed travel mode.

5. The battery electric vehicle according to claim 1, wherein the controller is configured to vary a rate of change of the speed of the engine indicated on the speed indication display to be different from a rate of change of the virtual engine speed, when the travel mode has transitioned from the motor travel mode to the variable-speed travel mode.

6. A control method of a battery electric vehicle, the battery electric vehicle including:
   a motor configured to output a torque to a driveshaft coupled to an axle;
   a switch configured to select, by an operation of a driver, one travel mode from a plurality of travel modes including a motor travel mode and a variable-speed travel mode, the motor travel mode being a mode of traveling while controlling the motor such that a required torque required for traveling is output to the driveshaft, the variable-speed travel mode being a mode of traveling while controlling the motor such that a torque output to the driveshaft meets a predetermined torque based on an input by the driver to select a gear stage, the predetermined torque being a torque that simulates torque behavior in an engine vehicle including an engine and a stepped transmission;
   a controller configured to:
      control the motor such that the battery electric vehicle travels in the travel mode selected by the switch,
      when the battery electric vehicle travels in the variable-speed travel mode, set a virtual engine speed based on a rotation speed of the driveshaft and a gear ratio of the selected gear stage of the stepped transmission corresponding to the engine vehicle of which the torque behavior is simulated, and
      when the battery electric vehicle travels in the variable-speed travel mode, control a torque output to the driveshaft of the motor based on an accelerator operation amount and the virtual engine speed; and
   a speed indication display configured to indicate a speed of the engine in the engine vehicle of which the torque behavior is simulated in the variable-speed travel mode,
   the control method comprising:
      transitioning the travel mode from the motor travel mode to the variable-speed travel mode, and
      varying, by the controller, the speed of the engine indicated on the speed indication display to be different from the virtual engine speed when the travel mode has transitioned from the motor travel mode to the variable-speed travel mode.

* * * * *